United States Patent
Pompei et al.

[19]

[11] Patent Number: 6,053,725
[45] Date of Patent: Apr. 25, 2000

[54] METHOD OF AND DEVICE FOR PRODUCING ENERGY

[75] Inventors: Ladislao Pompei, Cascine Vica-Rivoli; Guido Parisi, Turin, both of Italy

[73] Assignee: Selany Corporation N.V., Curacao, Netherlands Antilles

[*] Notice: This patent issued on a continued prosecution application filed under 37 CFR 1.53(d), and is subject to the twenty year patent term provisions of 35 U.S.C. 154(a)(2).

[21] Appl. No.: 08/696,846

[22] PCT Filed: Mar. 3, 1995

[86] PCT No.: PCT/EP95/00786

§ 371 Date: Oct. 23, 1996

§ 102(e) Date: Oct. 23, 1996

[87] PCT Pub. No.: WO95/23942

PCT Pub. Date: Sep. 8, 1995

[51] Int. Cl.[7] .................... F23D 7/00; F23D 9/00
[52] U.S. Cl. .................... 431/4; 431/2; 431/11; 431/208; 431/332
[58] Field of Search .................... 431/4, 207, 208, 431/332, 331, 330, 2, 213, 214, 210, 211, 212; 126/93, 94, 95; 122/32, 31 R

[56] References Cited

U.S. PATENT DOCUMENTS

| 303,199 | 8/1884 | Yates ........................... 431/330 |
| 306,934 | 10/1884 | Leet . |
| 370,883 | 10/1887 | Moore . |
| 713,397 | 11/1902 | Chandler . |
| 882,705 | 3/1908 | Lyon ........................... 431/332 |
| 968,825 | 8/1910 | Wilson . |
| 976,626 | 11/1910 | Beucler ........................... 431/332 |
| 1,394,164 | 10/1921 | Gerrard . |
| 1,570,327 | 1/1926 | Barrett . |
| 1,583,024 | 5/1926 | Sturgis ........................... 431/278 |
| 1,589,262 | 6/1926 | Strautman et al. . |
| 1,832,280 | 11/1931 | Coultas ........................... 431/4 |
| 2,086,639 | 7/1937 | Rees ........................... 431/328 |
| 2,124,169 | 7/1938 | Sheafe . |
| 2,149,770 | 3/1939 | Hook ........................... 321/332 |
| 2,222,575 | 11/1940 | Schutte . |
| 2,536,379 | 1/1951 | Linden . |
| 2,635,588 | 4/1953 | Bachem et al. . |
| 3,901,644 | 8/1975 | Armas ........................... 431/4 |
| 4,069,005 | 1/1978 | Palani . |
| 4,164,202 | 8/1979 | Lockett, Jr. . |
| 4,207,840 | 6/1980 | Dauvergne . |
| 4,445,570 | 5/1984 | Retallick . |
| 4,649,897 | 3/1987 | Ekman ........................... 431/332 |
| 4,687,491 | 8/1987 | Latty . |

FOREIGN PATENT DOCUMENTS

| 21493 | 2/1935 | Australia ........................... 431/330 |
| 2215030 | 9/1989 | United Kingdom ........................... 431/116 |
| 1396133 | 6/1995 | United Kingdom . |

*Primary Examiner*—Carl D. Price
*Attorney, Agent, or Firm*—Peter E. Rosden

[57] ABSTRACT

A method and device for producing heat energy by bringing water into contact with pre-heated oil in a chamber within a reaction vessel is disclosed. When the water and the oil meet, a violent reaction results in which a flame-like eruption of very hot gases is emitted. The heat energy released by this reaction is more than can be obtained by simply burning oil alone.

16 Claims, 2 Drawing Sheets

METHOD OF AND DEVICE FOR PRODUCING ENERGY

TECHNICAL FIELD

The invention relates to a method of producing heat energy in a continuous process and to a device for carrying out the method.

BACKGROUND OF THE INVENTION

It is known to use oil as a transfer medium in heat exchangers for steam production. Thus, U.S. Pat. No. 2,222,575 discloses cooling of hot oil by direct contact of the oil with cooling water which immediately evaporates, thereby generating steam for use. The hot oil is pumped into a chamber having a temperature of approximately 343° C., and water is sprayed over its surface from a plurality of nozzles. As the water evaporates, the oil is cooled and replaced by new, hot oil. U.S. Pat. No. 4,164,202 also discloses cooling of hot oil. In this reference, hot oil (about 350° C.) and water are both sprayed into the interior of a vessel in the form of little droplets. When the droplets meet, the water evaporates and the oil, cooled to some extent, falls down and collects at the bottom. U.S. Pat. No. 4,207,840 discloses a steam generator comprising a bath of oil in a spherical vessel which is continuously heated from below by wood combustion. In order to generate steam, water is injected into the bath underneath the heated oil. As the water comes into intimate contact with the heated oil, it evaporates and rises to the surface of the oil where it is discharged from the spherical vessel as steam. Thus, in the prior art, the oil does not take part in producing, but only in transporting heat. Claim 1 refers generally to this process in its preamble.

SUMMARY OF THE INVENTION

The inventors have detected a new method of producing heat energy using oil and water, through which a much higher level of energy and a much higher temperature is obtained than when only oil is burned. In the method of the invention, water and air are brought into contact with oil which has been previously heated to a temperature governed by the nature of the respective oil. As a result, an eruption of heat is caused which is comparable to an enormous and very hot flame-like exhaust. This means that an extremely strong combustion accompanied by a release of heat occurs. Thus, the production of energy results from both a transformation of energy and a production of heat. This type of reaction between the hot oil and the water can be duplicated very simply by using cooking oil, a saucepan and a high temperature thermometer. After pouring a quantity of oil into the saucepan and heating the oil to about 310° C., one slowly pours water onto the heated oil. Immediately, an impressive blaze occurs until the water disappears permitting more water to be added. This reaction is not primarily a matter of steam production, but is more like a type of combustion in which both oil and water are consumed in related quantities. The same reaction can be obtained at a temperature between 310 and 320° C. using car brake oil or car motor oil.

It is important to point out that the temperature to which the oil is heated normally should be lower than that of self combustion. The oil may not burn before being brought into contact with the water since it is the contact with water that causes the beginning of a new sort of combustion. This fact demonstrates the existence of an unusual reaction in which oil and water participate. It is possible that some oils have to be heated under a higher pressure than normal atmospheric pressure with the aim of obtaining the necessary temperature without combustion before the water contacts the oil.

The three references cited above maintain that no combustion occurs when water is brought into contact with oil at 343° C. It is important to observe that at 343° C. all the final products of petroleum distillation seem like oil, but in fact, there are a lot of composites that are not really oil but are more like bitumens. Although we cannot confirm or deny the possibility of a reaction between water and this particular "oil" since it has not yet been tested, we can confirm the peculiarity of this "oil".

The method has proved very effective when water is sprayed over the upper surface of pre-heated oil in a special chamber. In the method of this invention, a special chamber is used in which the oil has been heated, for example electrically, and water is sprayed over the upper surface of the hot oil. The pre-heating process can be discontinued when the process of the invention is initiated since that process itself maintains the oil at the desired temperature despite the continuous introduction of cold water (at 10 to 20° C.).

For the chamber, a vessel conically tapering to a top opening is preferred. Moreover, it has proved advantageous to also introduce air into the chamber or vessel. An ordinary oil burner supplied with water instead of oil can be used, e.g. for spraying water and introducing air into the vessel.

The oil to be used for purposes of this invention is preferably a fat oil, such as fat animal or fat vegetable oil. Vegetable oil has proven particularly effective, the neccessary starting temperature in such case being about 310° C. But, light vegetable oil has also been proven to be successful. However, the starting temperature should not be too high so as to avoid chemically desintegrating the oil before the process begins.

As a rough guide, the relationship of oil to water in the vessel should be approximately 40:60 by weight. An improvement, i.e. a reduction in the ratio of required oil, can be obtained if process parameters such as the supply of oil, water and air and the output-jet diameter are finely, more particularly electronically, controlled.

The use of sea water is possible and could even increase the performance of the system.

A feasibility study for the use of this basic process in endothermic type engines has been carried out with results remaining within entirely satisfactory parameters and with minimum loss during the energy transformation process. The method of this invention is widely applicable, encompassing planes, rockets, helicopters, hovercrafts, tanks, automobile cars, boats and conveyance means or any other appliance related to the combustion process. In addition, this basic process can be applied, as described, to burners of heating systems for home and industry as well as burning furnaces for industry processes.

The danger of a possible explosion has been completely eliminated, since the single components are not flammable until the precise starting conditions of the process are reached.

In this new innovative process there is also present a very low level of $NO_x$, generally no more than 8–10 ppm during combustion, while in other processes this level is generally much higher, typically no less than 50 ppm.

BRIEF DESCRIPTION OF THE DRAWINGS

Further details, advantages and developments of the invention will be seen from the following description of preferred embodiments and of equipment to carry out the method with reference to the enclosed drawings, in which.

DESCRIPTION OF THE PREFERRED EMBODIMENT

The method of the invention can be used primarily to generate heat energy, and secondarily to supply an engine, such as a turbo-engine or an endothermic engine, with driving energy.

Figure 1:
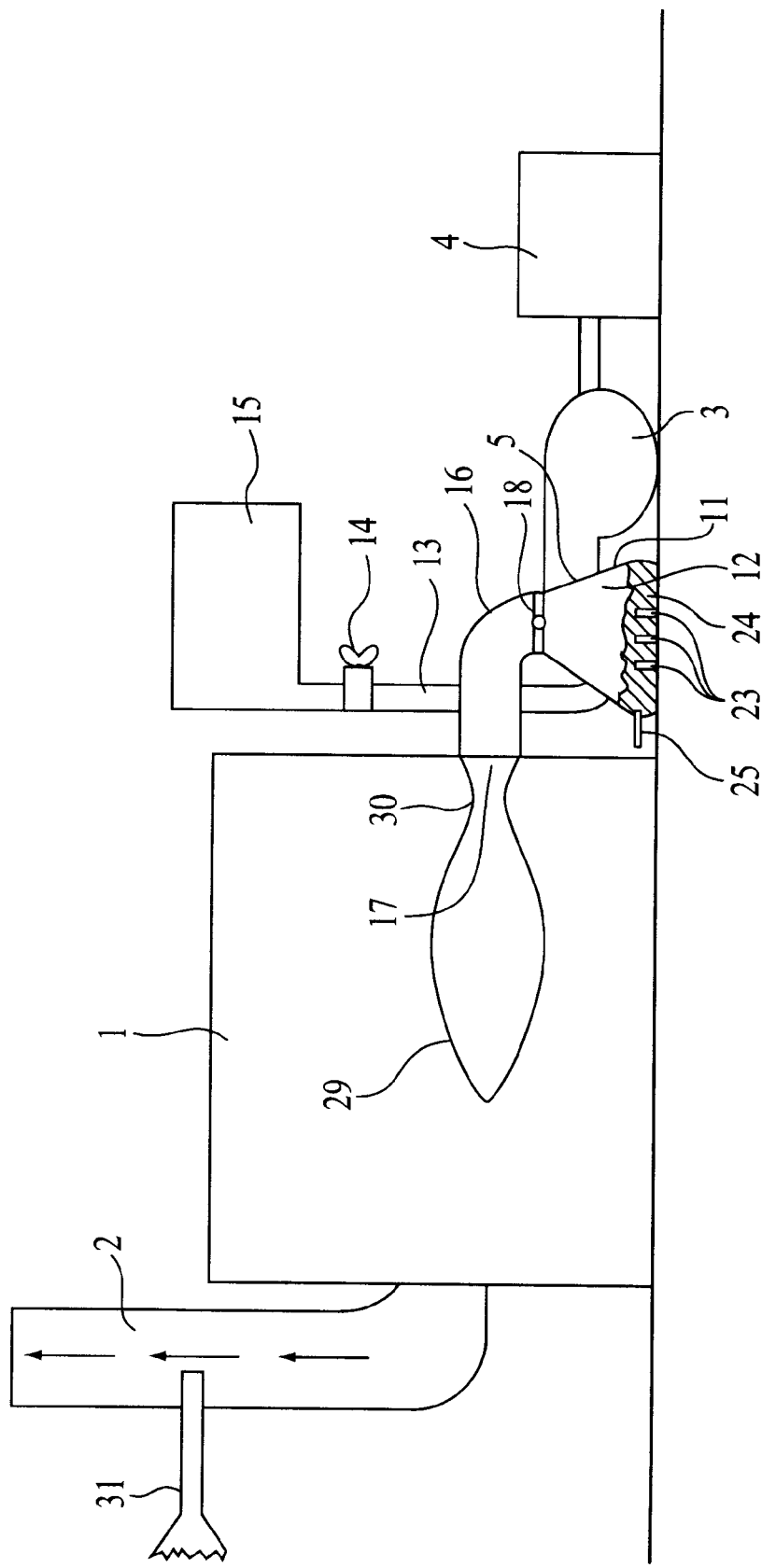
FIG. 1 shows a schematic diagram of a heating furnace equipped to exploit the method of the invention.

The equipment of FIG. 1 comprises a furnace 1 having an exhaust flue 2, e.g. a furnace as used for a boiler or for heating, and a typical burner 3 of the type usually used to spray heating oil and air into the furnace. The burner 3 is connected to a tank 4 which may be a tank such as a typical oil tank used for heating boilers, and is equipped with a nozzle 5 splitting off the material the burner 3 receives from tank 4.

In the described equipment, the burner 3 is not directly connected to the furnace 1 but is connected to a reaction vessel 11 containing a reaction chamber 12 connected to a supply line 13. This supply line 13 is fed via a control valve 14 by a further tank 15.

The vessel 11, and thus also the chamber 12, is conically shaped, tapering towards its upper end which opens into some sort of a flue 16 which terminates as a jet 17 into the furnace 1. The flue 16 contains a flap valve 18.

At the bottom of the vessel 11, electric heating wires 23 connected to a power source (not shown) are arranged. Alternatively, a gas burner or another heating facility may be provided.

For carrying out the invention, the tank 4 is filled with water and the tank 15 is filled with a vegetable oil. According to one way of carrying out the method, the vegetable oil may be a typical cooking oil. Under control of valve 14, a limited amount of the oil is allowed to pass into vessel 11, which in the depicted arrangement occurs due to gravity, while in other arrangements a pump may be used. In vessel 11, an amount of oil 24 is collected up to a certain level, e.g. 3 to 5 mm, so as to cover the heating wires 23. The amount of oil 24 in the vessel is heated to a temperature of approximately 330° C., the minimum for the type of oil used being 320° C. A thermometer 25 serves for observing the temperature. If vegetable oil is used, a number of small blue flames can be seen on the surface of the oil 24 collected in chamber 12 when the starting temperature is reached. Then, the burner 3 is started to spray water over the surface of the oil 24, at the same time supplying some air into chamber 12. The water contacts the heated oil and leads to a very violent reaction with the consequence that an eruption of very hot material is discharged from jet 17. The eruption consists of a flame-like bulb 29 of a white or blue glowing luminescent gas having a temperature of between 1200 and 2000° C., developing out of a non-luminant stem 30 of limited length, e.g. 20 to 50 mm, which appears immediately behind the jet 17. The existence of stem 30 depends on the control and regulation of the arrangement.

For experimental purposes, a gas analyzer 31 is inserted into the exhaust flue 2. By means of the gas analyzer 31, it has been found that the process exhaust gas flow causes a minimum of pollution when a water:oil ratio of 6:4 is used, typically 5 to 10 ppm of CO and 10 to 11 ppm of $NOX_X$.

As concerns the continued reaction, the power supply for the heating wires 23 may be switched off since the reaction itself causes sufficient heat to keep the oil hot and to heat the further supply of oil coming from the tank 15.

Though it is supposed that the water is the main energy source, there is some consumption of oil. It is assumed that by a thorough control of the equipment, i.e. of the water and air supply by the burner 3 and of the valves 14 and 18, the consumption of oil with relation to water can be approximated as 1 to 9. The optimal process parameters will have to be found out by tests. In case of manual control and without trying to optimize the system, the percentage of oil has to be selected higher, e.g. oil:water=4:6 by weight. The critical point is keeping the temperature of the oil 24 in vessel 11 above the minimum. The flap valve 18, which can also be constructed differently, assists to keep the temperature within vessel 11 at a value of about 320° C. It is possible to voluntarily stop the process by closing valve 14. In so doing, the relative quantity of water continuously added will cool the reaction chamber below the starting temperature bringing the process to a stop. For automatic control of the process, it will be necessary to continuously measure the temperature of the oil 24 in vessel 11 and, depending on this temperature, to control the supply of oil and water as well as air supplied by the burner.

The level of the oil 24 in chamber 12 should be maintained at a minimum of 3 to 4 mm to be sure that the process will continue. However, a level of 1 mm of oil has been found workable but accompanied by the risk of a sudden stop.

The reaction vessel 11 in FIG. 1 is supposed to be shaped as a truncated cone. This is not absolutely necessary, alternative possibilities include a truncated pyramid or, though less preferable, a cylinder.

Figure 2:
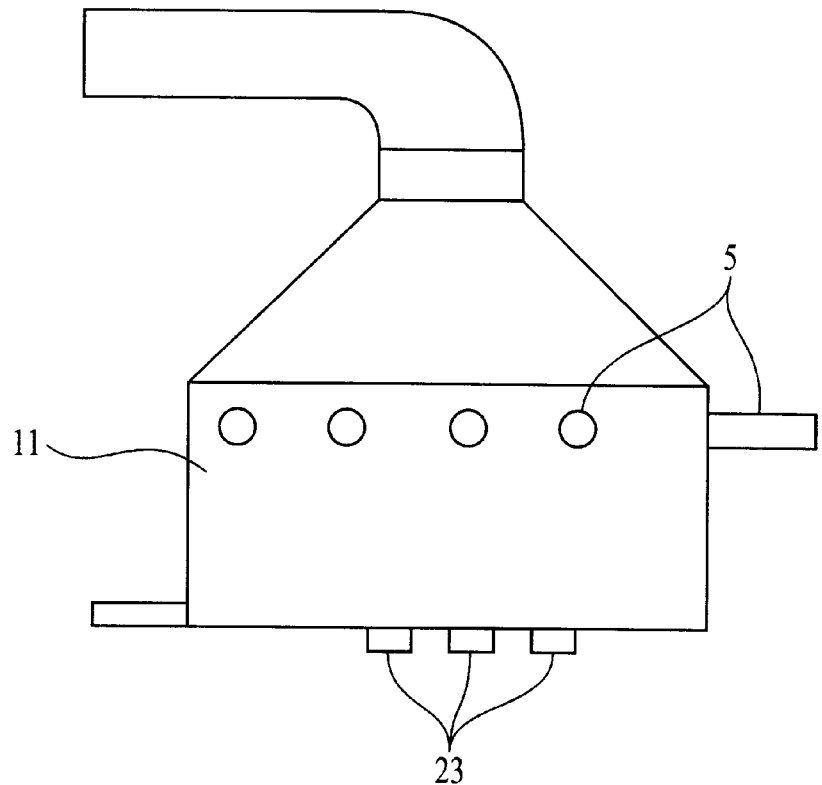
FIG. 2 shows a schematic elevational view of a section through a reactor vessel usable in the device of this invention.

FIG. 2 shows a shape for vessel 11 combining features of a cylinder and a cone. The construction is different from the construction of FIG. 1 in that a plurality of nozzles 5 exist which spray jointly onto the surface of the oil.

Figure 3:
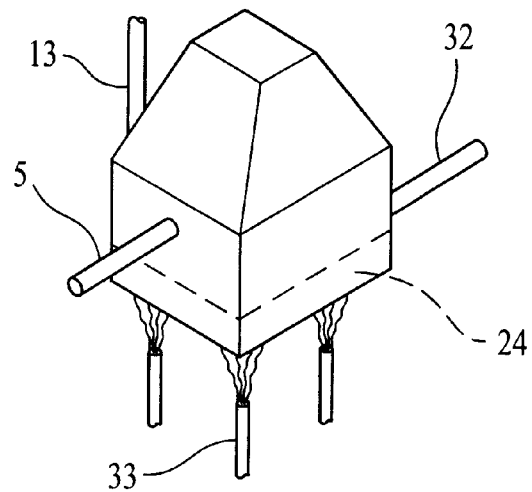
FIG. 3 also shows a schematic elevational view of a reactor vessel usable in this invention.

In FIG. 3, one nozzle 5 and a separate air supply 32 located above the level of oil 24 are directed into chamber 12 in vessel 11. In this embodiment, chamber 12 is comprised of the combination of a parallelepiped and a pyramid.

According to FIG. 3, there are no electric heating wires 23 as in FIGS. 1 and 2, but a gas flame 33 is used for heating the oil initially.

The proper size of vessel 11 depends on the heating power sought. More particularly, it is recommended to dimension vessel 11 directly proportional to the desired heating power. For example, in the arrangement of FIG. 1, for a heating power of the furnace and the burner of 400,000 J/h, the base diameter of the conical vessel should be 200 to 250 mm. Larger diameters will lead to a higher heating power but at the same time to larger consumptions, while smaller diameters will produce less heat but will lead to lower consumption of oil and water. The consumption is directly proportional to the diameter of vessel 11 or of the chamber 12 therein. The cone shape has the advantage of reflecting part of the generated heat back to the oil 24 so as to more easily keep it hot. Also small drops of the water-oil mixture dispersed within chamber 12 are reflected by such a cone shape. It has to be taken into consideration that overly large jets could possibly reduce the process temperature below the process activation temperature of the system which is about 320° C., in which case the process will be stopped.

Regardless, due to the relationship between diameter and power, which relationship may be based on the dissociation volume of the water involved, it is possible to experimentally determine the exact size of vessel 11 for different calorimetric potentials of different burners and furnaces.

When starting the process, as mentioned, the oil quantity in vessel 11 has to be heated to e.g. 320° C. This temperature is slightly lower than the temperature of flammability of the oil, which represents a safety point because the oil can be stored safely without any problem or cooling necessity. As mentioned, the temperature depends on the oil used.

The embodiments shown describe the use of the process for heating purposes. Of course, the generation of heat energy can also be exploited in a different manner, such as for driving a hot air engine or standard engines or turbines modified for the purpose.

The following examples show possible applications. The method can be used with a typical turbine. A turbine has burners with combustion chambers on the external toroidal diameter, and, in this case, the system can be easily applied with great advantage, taking into consideration the typical very high fuel consumption of such machines and the high $NO_x$ output in their exhaust gases.

In the case of a diesel engine, the following modifications could be made:
- use two injection pumps, one for the oil, one for the water (air comes in the intake manifold in standard engines);
- modify pump timing;
- have second pump inject water a few decrees after maximum height of the piston exactly a fraction of time after combustion; and
- position the engine on a 180° reverse basis, i.e. the crankshaft is placed over the pistons.

The reverse engine position is required to allow an oil level to form at the base of the reversed cylinder. This level must be both sufficient for the burning cycle but not so large as to raise the compression ratio excessively. This embodiment will work also for a gasoline injected engine.

We claim:

1. A method for producing heat energy with a minimum of pollutants through a partially self-sustaining reaction process in a reaction vessel containing a reaction chamber which includes a controllable supply line connected to a supply of ignitable oil having a known ignition temperature, a temperature measuring device, a source of energy for applying heat to the ignitable oil, at least one nozzle having both an input and an output wherein the input is connected to a supply of water and air and the output is connected to the reaction vessel and an output flue having two ends one of which is connected to the reaction vessel, comprising the steps of:
   - admitting oil into the reaction chamber through the controllable supply line up to a level below that at which the lowest positioned nozzle is connected to the reaction vessel;
   - applying heat energy to the oil contained in the reaction chamber from the source of energy to preheat the oil;
   - measuring the temperature of the oil in the reaction chamber;
   - continuously spraying a mixture of water in a liquid form and air supplied from the supply of water and air onto the surface of the preheated oil from at least one nozzle after the temperature of the oil is measured to be slightly less than its known ignition temperature;
   - discontinuing the application of heat energy to the oil after a heat producing reaction process between the oil, air and water has begun;
   - maintaining the level of oil above a minimum level for as long as it is desired to maintain the reaction by adding oil through the controllable supply line;
   - discharging heat energy from the reaction chamber into the end of the output flue connected to the reaction vessel; and
   - collecting the heat energy from the other end of the output flue.

2. The method of claim 1 wherein the reaction vessel tapers conically from a wide bottom to a narrower top opening which is connected to one end of the output flue.

3. The method of claim 2 wherein the oil used is a fatty oil.

4. The method of claim 3 wherein the minimum level of oil in the chamber is maintained by means of the controllable supply line at at least 1 mm in depth but preferably between 3 and 5 mm in depth.

5. The method of claim 3 wherein the oil used is a fatty vegetable oil.

6. The method of claim 5 wherein the temperature to which the oil is preheated is at least 320° C.

7. The method of claim 6 wherein the relationship of oil to water used in the reaction vessel is 40:60 parts by weight, respectively.

8. The method of claim 3 wherein pollutants released in the reaction process are approximately 10 ppm of CO and 10 ppm of $NOX_x$.

9. The method of claim 3 wherein sea water is supplied to the reaction vessel.

10. A device for producing heat energy with a minimum production of pollutants through a partially self-sustaining process involving a reaction between oil, water and air comprising:
    - a reaction vessel containing a reaction chamber;
    - first means connected to the reaction chamber for admitting a controllable supply of oil into the reaction chamber up to a desirable level;
    - second means associated with the reaction chamber for applying heat to the oil which has been admitted into the reaction chamber;
    - third means in contact with the oil in the reaction chamber for measuring and indicating its temperature;
    - fourth means connected to the reaction chamber for spraying a controllable supply of water and air onto the surface of the oil in the reaction chamber after said third means indicates that the oil in the reaction chamber has reached a predetermined temperature;
    - directing heat energy generated by the reaction within the reaction chamber away from said chamber; and
    - a furnace into which the other end of said flue opens and into which said flue directs the heat energy collected from said reaction vessel.

11. The device of claim 10 wherein fatty vegetable oil is supplied to the reaction chamber by said first means.

12. The device of claim 11 wherein said reaction vessel and the reaction chamber are cone-shaped.

13. The device of claim 12 wherein optimal efficiency is obtained when the diameter of the base of the reaction chamber is maintained proportional to the desired energy output in the ratio of approximately 225 mm: 400,000 J/hr.

14. The device of claim 13 wherein the production of pollutants is approximately 10 ppm of CO and 10 ppm of $NOX_x$.

15. The device of claim 10 wherein said reaction vessel and the reaction chamber combine the shapes of a cylinder and a cone.

16. The device of claim 10 wherein said reaction vessel and the reaction chamber combine the shapes of a parallelepiped and a pyramid.

* * * * *